UNITED STATES PATENT OFFICE.

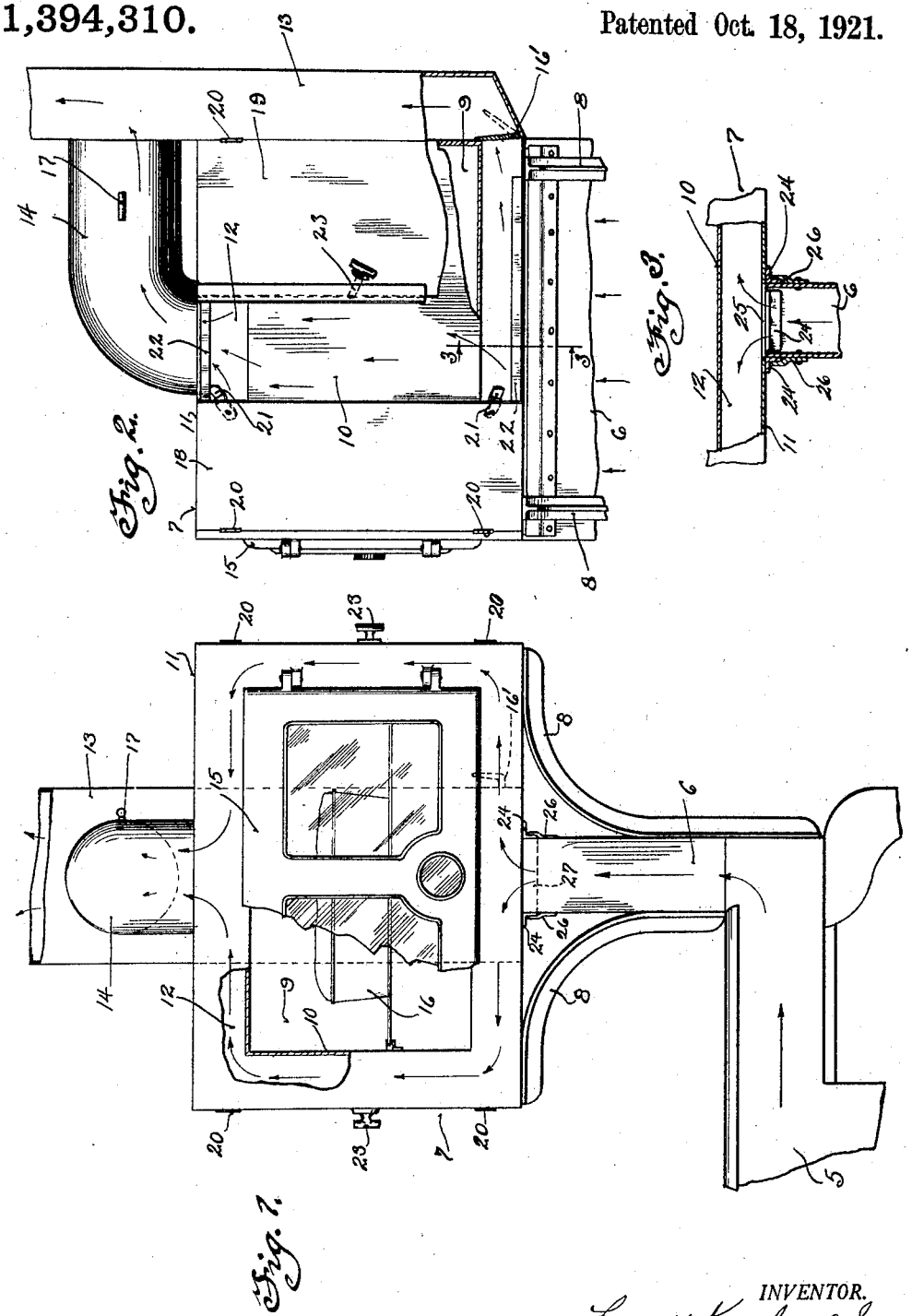

FRANK KESSLER, SR., OF MILWAUKEE, WISCONSIN.

COOKING-OVEN.

1,394,310.

Specification of Letters Patent.

Patented Oct. 18, 1921.

Application filed May 13, 1920. Serial No. 381,090.

*To all whom it may concern:*

Be it known that I, FRANK KESSLER, Sr., a citizen of the United States, and resident of Milwaukee, in the county of Milwaukee and State of Wisconsin, have invented new and useful Improvements in Cooking-Ovens, of which the following is a description, reference being had to the accompanying drawings, which are a part of this specification.

The present invention relates to certain new and useful improvements in cooking ovens.

It is one of the objects of this invention to provide a cooking oven having means for controlling the heat thereof and so constructed that the same may be readily bodily removed with ease.

A further object of the present invention is to provide a cooking oven having a heating chamber completely surrounding the sides and top thereof and provided with cleanout doors permitting ready access to the interior of the heating chamber for removing soot and other dirt deposits therefrom.

A still further object of this invention is to provide an oven having means for directing hot gases around the sides, top and bottom thereof, or only through the bottom thereof whereby the same may be utilized as a warming oven.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a front view of a portion of a cooking stove with my improved oven attached thereto, parts of the oven being broken away and in section to more clearly illustrate details of construction;

Fig. 2 is a side view thereof, parts being broken away and in section and the side clean-out doors being swung to partly open position; and Fig. 3 is a detail sectional view taken on the plane indicated by the line 3—3 of Fig. 2.

Referring now more particularly to the accompanying drawing, the numeral 5 designates generally a heating stove or range of any suitable design having a heating duct 6 connected with the fire box of the stove for supplying heat to my improved oven 7. The oven is detachably connected with the duct 6 by means to be later described and is supported in position by oppositely diverged supporting arms 8 upon which the oven rests.

My improved oven preferably consists of a cooking compartment 9 formed by a shell 10 having one end open, the shell being positioned within and spaced from the walls of an outer larger shell 11, the space between the walls of the shells 10 and 11 forming a heating chamber 12 surrounding the sides, top and bottom of the shell 10. The rear closed end of the shell 10 forms one side of a chimney or flue 13 which communicates with the heating chamber at its bottom and is also connected with the top of the heating chamber by a duct 14 as best shown in Fig. 2.

The forward open end of the shell 10 is normally closed by a door 15 which permits the ready access to the interior of the cooking compartment for convenience in attending to articles 16 positioned therein. When it is desired to raise the temperature within the compartment 9 to a high point, the flue 13 is cut off from communication with the lower portion of the heating chamber by means of a damper 16', in which case the heated gases from the range pass through the duct 6 into the lower portion of the heating chamber, thence along the bottom of the shell 10, then upwardly and then along the top of the shell 10 and then through the duct 14 into the flue 13. The heat of the oven may be controlled by the damper 16', as by opening the same a part of the heated gases will pass directly into the flue without passing around the sides of the shell 10, and to further reduce the heat, the duct 14 is completely cut off from communication with the flue 13 by means of a damper 17 as will be readily apparent.

As carbon deposits, commonly termed soot, will collect within the heating chamber, I provide means for permitting the ready access thereto which consists in forming each side of the heating chamber with two doors 18 and 19 hingedly connected at opposite ends thereof as at 20. The door 18 has pivoted latches 21 carried thereby for detachable engagement with the corner reinforcing rib or angle iron 22 to retain the same in closed position, and the door 19 is secured in closed position by means of the usual form of latch 23 which engages behind the adjacent edge of the door 18. As will be obvious this construction permits the free access to the entire interior of the heating chamber to facilitate the removal of all carbon deposits.

Where the duct 6 connects with the oven, I provide a detachable connection so designed as to form means for assisting in the supporting of the oven and at the same time prevent the escape of the heated gases at the point of connection. This point of connection consists of two angle irons 24 secured to the bottom of the shell 11 adjacent the opening 25 therein which engage between the adjacent walls of the duct and a plate 26 secured thereto, the other sides of the opening 25 having angle irons 27 positioned there adjacent which engage the inner portions of the adjacent sides of the duct 6. Thus it will be obvious I provide a firm but readily detachable connection between the oven and duct.

What I claim as my invention is:

1. A cooking oven comprising a food receiving compartment, a heating chamber surrounding the sides, top, bottom and rear of said compartment, a door communicating with the front of the compartment; means for conducting heated gases to and from the heating chamber, doors forming the side walls of the heating chamber to permit access thereto.

2. A cooking oven comprising a food receiving compartment, a heating chamber surrounding the top, bottom and sides thereof, a heated gas supplying duct communicating with the bottom of the heating chamber, an outlet flue adjacent the heating chamber and communicating with the bottom of said chamber, a duct connecting the top of said chamber with said flue, means for controlling the egress of the hot gas from said chamber where the bottom thereof communicates with the flue, and means for controlling the passage of the hot gas through the duct connecting the top of the heating chamber with the flue.

3. A device of the class described comprising a cooking oven of substantially rectangular shape and adapted to be readily removably supported above a heated gas supplying duct, an inner shell forming a food receiving compartment, an outer shell surrounding the inner shell and having the side walls thereof spaced therefrom to provide a heating chamber surrounding the inner shell, and means for permitting the ready access to the interior of the heating chamber including a pair of door members forming each side of said outer shell.

4. In a device of the class described, the combination with a duct connected with a source of heat supply and oppositely directed bracket arms having their top surface on a plane substantially level with the top of said duct, of an oven supported upon said bracket arms and duct, a heating chamber for said oven connected with the duct, plates secured to the sides of said duct adjacent the top thereof and providing channels, and depending flange portions carried by the bottom of said oven and engaging in said channels.

In testimony whereof, I affix my signature.

FRANK KESSLER, Sr.